US011312191B2

United States Patent
Nakatani et al.

(10) Patent No.: US 11,312,191 B2
(45) Date of Patent: Apr. 26, 2022

(54) PNEUMATIC TIRE

(71) Applicant: Sumitomo Rubber Industries, Ltd., Kobe (JP)

(72) Inventors: Masako Nakatani, Kobe (JP); Takahiro Kawachi, Kobe (JP); Ayuko Yamada, Kobe (JP); Takuya Horiguchi, Kobe (JP); Masataka Hiro, Kobe (JP); Takayuki Nagase, Kobe (JP); Hiroshi Ito, Kobe (JP); Fumiya Kato, Kobe (JP); Subaru Toya, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 98 days.

(21) Appl. No.: 16/850,325

(22) Filed: Apr. 16, 2020

(65) Prior Publication Data

US 2020/0238768 A1 Jul. 30, 2020

Related U.S. Application Data

(63) Continuation of application No. 15/781,968, filed as application No. PCT/JP2017/042349 on Nov. 27, 2017, now abandoned.

(30) Foreign Application Priority Data

Dec. 7, 2016 (JP) ................ 2016-237853

(51) Int. Cl.
*B60C 19/00* (2006.01)
*B60C 1/00* (2006.01)
(Continued)

(52) U.S. Cl.
CPC .............. *B60C 19/002* (2013.01); *B60C 1/00* (2013.01); *B60C 1/0016* (2013.01); *B60C 5/00* (2013.01);
(Continued)

(58) Field of Classification Search
CPC .............................. B60C 5/002; B60C 19/002
See application file for complete search history.

(56) References Cited

U.S. PATENT DOCUMENTS 3,854,516 A 12/1974 Burnell
3,866,651 A 2/1975 Gomberg
(Continued)

FOREIGN PATENT DOCUMENTS

EP 0620129 A1 10/1994
EP 1795378 A2 6/2007
(Continued)

OTHER PUBLICATIONS

Extended European Search Report, dated Jun. 26, 2019, for European Application No. 17879235.4.
(Continued)

*Primary Examiner* — Justin R Fischer
(74) *Attorney, Agent, or Firm* — Birch, Stewart, Kolasch & Birch, LLP

(57) ABSTRACT

A pneumatic tire 1 comprises a carcass 6 extending between bead cores of bead portions via a tread portion 2 and sidewall portions, and a belt layer 7 arranged on an outer side in a tire radial direction of the carcass 6 and inside of the tread portion 2. The pneumatic tire 1 further comprises a damping rubber body 30 arranged between the carcass 6 and the belt layer 7, and a noise damper 20 arranged on an inner cavity surface of the tread portion 2. A width W1 in a tire axial direction of the damping rubber body 30 is in a range of from 60% to 130% of a width W2 in the tire axial direction of the belt layer 7, and a water absorption rate of the noise damper 20 is in a range of from 10% to 25%.

18 Claims, 4 Drawing Sheets

(51) Int. Cl.
*B60C 9/18* (2006.01)
*C08L 7/00* (2006.01)
*C08L 9/06* (2006.01)
*B60C 11/00* (2006.01)
*B60C 5/00* (2006.01)

(52) U.S. Cl.
CPC ............ *B60C 9/18* (2013.01); *B60C 11/00* (2013.01); *C08L 7/00* (2013.01); *C08L 9/06* (2013.01); *B60C 2009/1828* (2013.01); *B60C 2009/1878* (2013.01); *C08L 2205/025* (2013.01); *C08L 2205/035* (2013.01)

(56) References Cited

U.S. PATENT DOCUMENTS

| | | | |
|---|---|---|---|
| 4,349,061 | A | 9/1982 | Hirakawa et al. |
| 4,392,522 | A | 7/1983 | Bschorr |
| 4,434,864 | A | 3/1984 | Lupo |
| 4,640,952 | A | 2/1987 | Takiguchi et al. |
| 4,815,511 | A | 3/1989 | Brayer et al. |
| 5,879,483 | A | 3/1999 | Gerresheim et al. |
| 7,018,700 | B2 | 3/2006 | Park |
| 2006/0272759 | A1 | 12/2006 | Yukuwa |
| 2007/0017619 | A1 | 1/2007 | Yukuwa |
| 2008/0297725 | A1 | 12/2008 | Mimura |
| 2009/0277553 | A1 | 11/2009 | Tanno et al. |
| 2011/0118373 | A1 | 5/2011 | Prissok et al. |

FOREIGN PATENT DOCUMENTS

| | | |
|---|---|---|
| EP | 3431309 A1 | 1/2019 |
| JP | 2000-225806 A | 8/2000 |
| JP | 2006-143020 A | 6/2006 |
| JP | 2006-335199 A | 12/2006 |
| JP | 2007-22445 A | 2/2007 |
| JP | 2009-292461 A | 12/2009 |
| JP | 2015-30307 A | 2/2015 |
| JP | 2016-33014 A | 3/2016 |
| JP | 2016-055439 A | 4/2016 |

OTHER PUBLICATIONS

Written Opinion of the International Searching Authority for PCT/JP2017/042349 dated Feb. 9, 2018.

PNEUMATIC TIRE

CROSS-REFERENCE TO RELATED APPLICATIONS

This application is a Continuation of application Ser. No. 15/781,968 filed on Jun. 6, 2018, which is a National Phase of PCT International Application No. PCT/JP2017/042349 filed on Dec. 27, 2017, which claims priority under 35 U.S.C. § 119(a) to Patent Application No. 2016-237853 filed in Japan on Dec. 7, 2016. All of the above applications are hereby expressly incorporated by reference into the present application.

TECHNICAL FIELD

The present invention relates to a pneumatic tire provided with a noise damper on an inner cavity surface of a tread portion.

BACKGROUND ART

Conventionally, as a technique for suppressing running noise of a pneumatic tire, as disclosed in Patent Literature 1, a pneumatic tire has been known in which a noise damper made of a sponge material is arranged on the inner cavity surface of the tread portion.

PRIOR ART DOCUMENT

Patent Literature

Patent Literature 1: Japanese Patent Application Publication No. 2009-292461

On the other hand, as a repair method when a pneumatic tire is punctured, a method of sealing the punctured hole by spreading puncture repair liquid including a puncture sealing agent on the inner cavity surface is known.
In the puncture repair using the puncture repair liquid, it is necessary to spread the puncture repair liquid on the inner cavity surface of the repair spot where a through hole is formed, therefore, firstly the pneumatic tire is rotated so that the repair spot is positioned downward and then the puncture repair liquid is injected into the pneumatic tire in that state.

However, when the puncture repair liquid is used for repairing the puncture of the pneumatic tire provided with the noise damper as disclosed in Patent Literature 1, the puncture repair liquid is absorbed in pores of the noise damper. Thereby, the puncture repair liquid is intensively absorbed by the noise damper in the repair spot, thus, it is difficult for the puncture repair liquid to be uniformly distributed in a tire circumferential direction, therefore, it is possible that force variation, that is, uniformity of the pneumatic tire after the puncture repair is affected. The term "uniformity" as used herein refers to the uniformity of the weight including the tire, the noise damper, and the puncture repair liquid. If such uniformity is impaired, it is possible that running noise tends to become large.

SUMMARY OF THE INVENTION

Problems to be Solved by the Invention

The present invention was made in view of the above, and a primary object thereof is to provide a pneumatic tire capable of suppressing influence on the uniformity after puncture repair while suppressing the running noise.

Means for Solving the Problem

In one aspect of the present invention, a pneumatic tire comprises a carcass extending between bead cores of bead portions via a tread portion and sidewall portions, a belt layer arranged on an outer side in a tire radial direction of the carcass and inside of the tread portion, and a porous noise damper arranged on an inner cavity surface of the tread portion, wherein a water absorption rate of the noise damper is in a range of from 10% to 25%, the water absorption rate being calculated by a following formula (1): water absorption rate (%)=weight change before and after immersion (g)/volume at 50% compression (cm3)×100 (1).

In another aspect of the invention, it is preferred that density of the noise damper is in a range of from 10 to 40 kg/m3.

In another aspect of the invention, it is preferred that volume V1 of the noise damper is in a range of from 0.4% to 30% of total volume V2 of a tire inner cavity.

In another aspect of the invention, it is preferred that tensile strength of the noise damper is in a range of from 70 to 115 kPa.

In another aspect of the invention, it is preferred that a loss tangent tan δ at 0 degree Celsius of a tread rubber arranged on an outer side in the tire radial direction of the belt layer is not less than 0.4 and the loss tangent tan δ at 70 degrees Celsius of the tread rubber is not more than 0.2.

In another aspect of the invention, it is preferred that a tread rubber arranged on an outer side in the tire radial direction of the belt layer is a rubber composition having a value not less than 20, the value being calculated by a following formula: (1.4×carbon black content (phr)+silica content (phr))/sulfur content (phr).

In another aspect of the invention, it is preferred that the pneumatic tire according to the invention further comprises a damping rubber body arranged inside of the tread portion.

In another aspect of the invention, it is preferred that a width W1 in a tire axial direction of the damping rubber body is in a range of from 60% to 130% of a width W2 in the tire axial direction of the belt layer.

In another aspect of the invention, it is preferred that the damping rubber body is arranged between the carcass and the belt layer.

In another aspect of the invention, it is preferred that the pneumatic tire according to the invention further comprises a band layer arranged on an outer side in the tire radial direction of the belt layer and inside of the tread portion, and the damping rubber body is arranged between the belt layer and the band layer.

In another aspect of the invention, it is preferred that the pneumatic tire according to the invention further comprises a band layer arranged on an outer side in the tire radial direction of the belt layer and inside of the tread portion, and the damping rubber body is arranged on an outer side in the tire radial direction of the band layer.

In another aspect of the invention, it is preferred that thickness in the tire radial direction of the damping rubber body is not less than 0.3 mm.

In another aspect of the invention, it is preferred that relationship between hardness H1 of the damping rubber body and hardness H2 of a tread rubber arranged on an outer side in the tire radial direction of the belt layer satisfies a following expression: 0.5≤H1/H2≤1.0.

Advantageous Effects of the Invention

According to the pneumatic tire of the present invention, the noise damper is provided on the inner cavity surface of the tread portion, therefore, cavity resonance in the tire inner cavity is suppressed, thereby, the running noise of the pneumatic tire is decreased. In the present invention, the water absorption rate of the noise damper calculated by the above formula (1) is in a range of from 10% to 25%, therefore, the absorption of the puncture repair liquid by the noise damper is suppressed. Thereby, the puncture repair liquid is likely to be uniformly distributed in the tire circumferential direction without concentrating on a part of the noise damper at the repair spot, therefore, it is possible that the deterioration of the uniformity (that is the uniformity of the weight including the pneumatic tire, the noise damper, and the puncture repair liquid) is prevented, thereby, it is possible that the running noise is effectively prevented.

MODE FOR CARRYING OUT THE INVENTION

Figure 1:
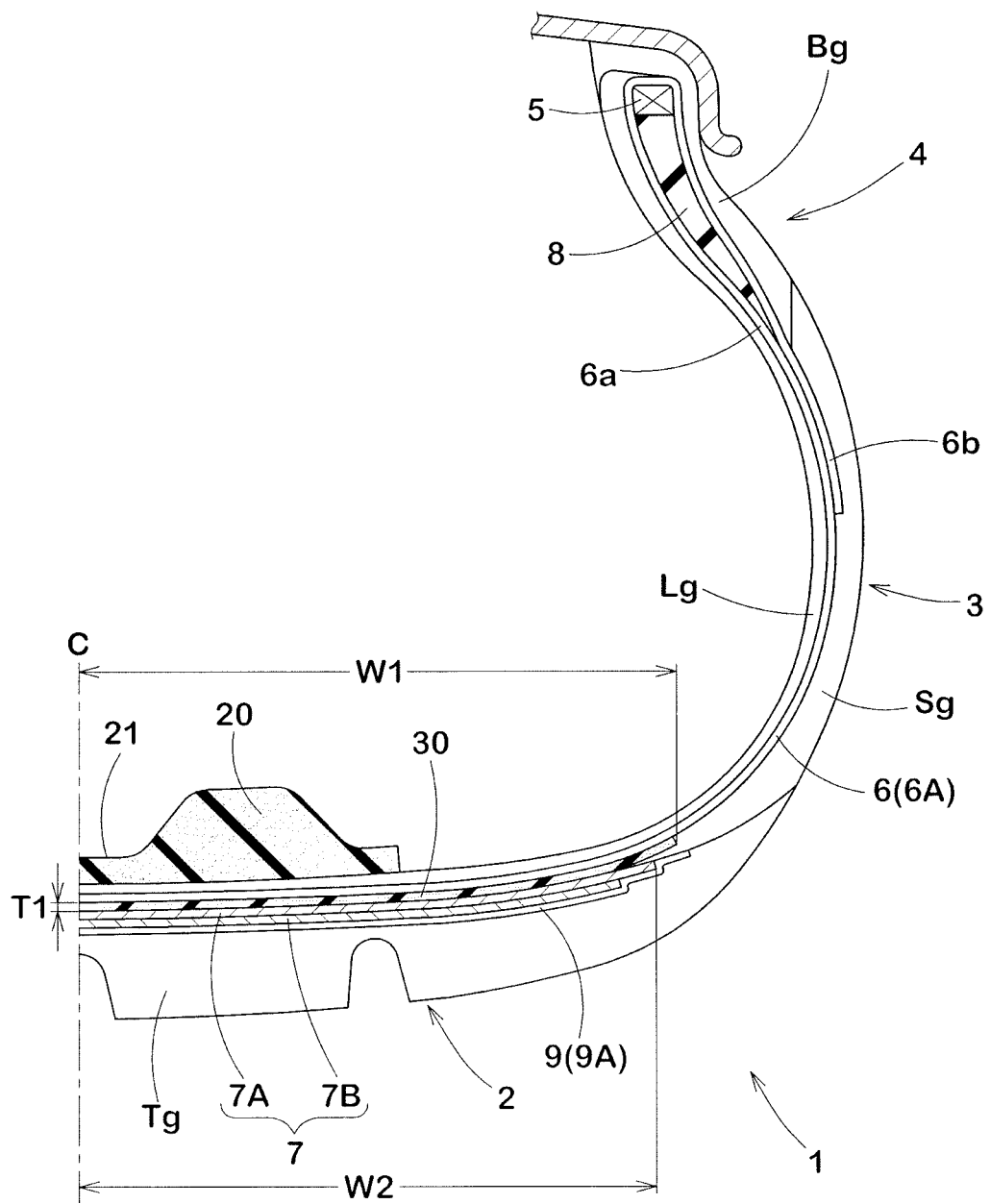
FIG. 1 a cross-sectional view of a pneumatic tire as an embodiment of the present invention.

An embodiment of the present invention will now be described in detail.
FIG. 1 is a tire meridian section passing through a tire rotational axis of a pneumatic tire 1 of the present embodiment in a standard state. The standard state is a state in which the tire is mounted on a standard rim, inflated to a standard inner pressure, and loaded with no tire load. Hereinafter, dimensions and the like of various parts of the tire are those measured under the standard state, unless otherwise noted.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard inner pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO. When the tire is for a passenger car, it is set to 200 kPa uniformly in consideration of the actual use frequency and the like.

As shown in FIG. 1, the pneumatic tire (hereinafter may be simply referred to as "tire") 1 in this embodiment is provided with a carcass 6 extending between bead cores 5 of bead portions 4 via a tread portion 2 and sidewall portions 3, and a belt layer 7 arranged on an outer side in a tire radial direction of the carcass 6 and inside the tread portion 2. In this embodiment, a tire for a passenger car is shown as the tire 1.

The carcass 6 is formed by a single carcass ply 6A, for example. The carcass ply 6A includes a main body portion 6a extending between the bead cores 5 and turned up portions 6b each being turned up around respective one of the bead cores 5 from inside to outside in a tire axial direction so as to be engaged with the respective one of the bead cores 5. In the carcass ply 6A, organic fiber cords made of an organic material such as aromatic polyamide and rayon are used as carcass cords, for example. The carcass cords are arranged at an angle in a range of from 70 to 90 degrees with respect to a tire equator C, for example. The carcass ply 6A is formed by a plurality of the carcass cords covered with topping rubber. Between the main body portion 6a and each of the turned up portions 6b, a bead apex rubber 8 extending radially outwardly from respective one of the bead cores 5 in a tapered manner is arranged.

On an outer side of the carcass 6, a tread rubber Tg for forming a ground contacting surface, sidewall rubbers Sg each for forming an outer surface of respective one of the sidewall portions 3, bead rubbers Bg each for forming an outer surface of respective one of the bead portions 4, and the like are arranged. On the other hand, on an inner side of the carcass 6, an inner liner rubber Lg for keeping tire inner pressure and the like are arranged.

The belt layer 7 in this embodiment is formed by two belt plies 7A and 7B in which belt cords are arranged at an angle in a range of from 15 to 45 degrees with respect to the tire equator C, for example, and the belt plies 7A and 7B are overlapped in the tire radial direction so that the belt cords of the belt ply 7A and the belt cords of the belt ply 7B cross each other. For the belt cords, steel, aramid, rayon or the like is suitably used, for example. By covering a plurality of the belt cords with the topping rubber, the belt plies 7A and 7B are formed.

The pneumatic tire 1 in this embodiment is provided with a band layer 9 arranged on an outer side in the tire radial direction of the belt layer 7. The band layer 9 includes a band ply 9A in which band cords of an organic fiber, nylon cords in this embodiment, are spirally wound at an angle not more than 10 degrees, preferably not more than 5 degrees with respect to the tire circumferential direction.

The pneumatic tire 1 is provided with a noise damper 20 arranged on an inner cavity surface of the tread portion 2. The noise damper 20 is made of a porous sponge material, for example. The sponge material is a cavernous porous structure body including not only a so-called sponge itself having interconnected cells formed by foamed rubber or a synthetic resin but also a web body formed of an animal fiber, a vegetable fiber, or a synthetic fiber and the like integrally interwoven, for example. Further, the "porous structure body" includes not only a body having the interconnected cells but also a body having closed cells. For the noise damper 20 in this embodiment, a sponge material made of polyurethane having interconnected cells is used.

In the sponge material as described above, the pores on the surface of or inside the sponge material convert vibration energy of the vibrating air into thermal energy, therefore, the vibration energy is consumed, thereby, sound (cavity resonance energy) is decreased, therefore, the running noise of the pneumatic tire 1 is decreased. Further, the sponge material is easy to deform such as contraction, flexion, etc., therefore, deformation of the tire during running is not substantially affected. Thereby, it is possible that deterioration of steering stability is prevented. Moreover, specific gravity of the sponge material is very small, therefore, it is possible that deterioration of weight balance of the tire is prevented.

As the sponge material, synthetic resin sponge such as ether type polyurethane sponge, ester type polyurethane sponge, polyethylene sponge, and rubber sponge such as chloroprene rubber sponge (CR sponge), ethylene propylene rubber sponge (EDPM sponge), nitrile rubber sponge (NBR sponge) can be preferably and suitably used, and in particular, a polyurethane type or polyethylene type sponge including an ether type polyurethane sponge is preferred from the point of view of noise damping property, lightweight property, controllability of foaming, durability, and the like.

The noise damper 20 has an elongated belt-like shape having a bottom surface fixed to the inner cavity surface of the tread portion 2 and extends in the tire circumferential direction. At this time, outer end portions in the circumferential direction of the noise damper may be in contact with each other to form a substantially annular shape, or the outer end portions may be spaced apart in the tire circumferential direction.

The noise damper 20 has substantially the same cross-sectional shape at an arbitrary position in the tire circumferential direction except for the outer end portions. In order to prevent collapse and deformation during running, it is preferred that the cross-sectional shape is a flat and horizontally elongated shape in which a height is smaller than a width in the tire axial direction. In particular, as in this embodiment, it is preferred to have a concave groove 21 extending continuously in the tire circumferential direction on a side of the radially inner surface. The concave groove 21 increases a surface area of the noise damper 20, therefore, it is possible that more resonance energy is absorbed, and heat dissipation is increased, therefore, it is possible that the temperature rise of the sponge material is suppressed.

Figure 2:
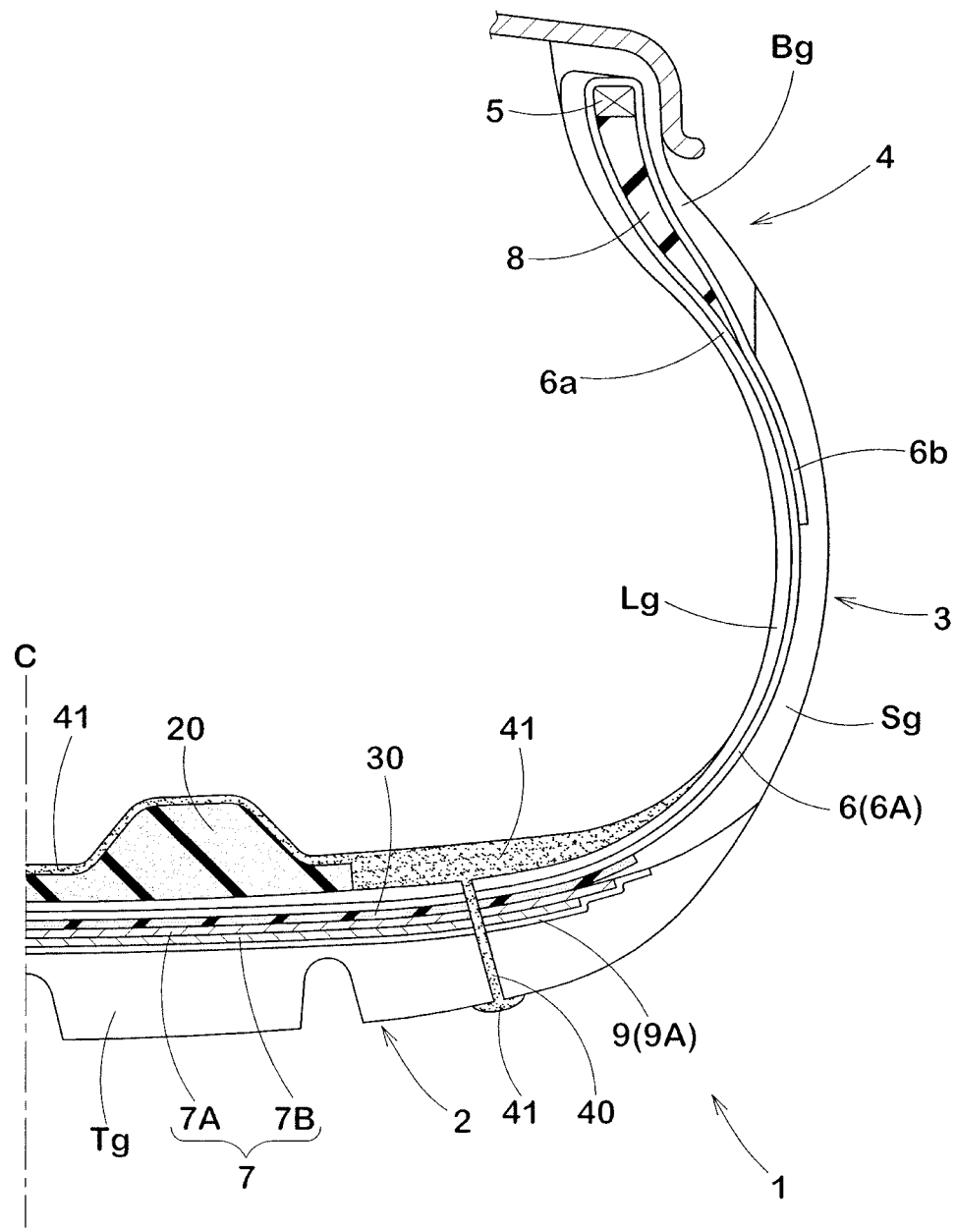
FIG. 2 a cross-sectional view of the pneumatic tire of FIG. 1 after puncture repair.

FIG. 2 is the pneumatic tire 1 after puncture repair by using a puncture repair liquid. A through hole 40 formed in the tread portion 2 by running over a nail and the like is filled with puncture repair liquid 41, therefore, the through hole 40 is sealed.

A water absorption rate of the noise damper 20 is in a range of from 10% to 25%. Here, the water absorption rate of the noise damper 20 is calculated by the following formula (1).

$$\text{Water absorption rate (\%)} = \text{Weight change before and after immersion (g)/Volume at 50\% compression (cm3)} \times 100 \quad (1)$$

In this embodiment, for measuring the weight change before and after immersion of the noise damper 20, a test piece having a length of 50 mm, a width of 50 mm, and a thickness of 20 mm is used. After measuring the weight before immersion, the test piece was compressed by 50% in the thickness direction, then the weight was measured after immersion in water at a temperature of 20 degrees Celsius and at water depth of 10 cm for 24 hours. Since the volume at 50% compression can be calculated from the above dimensions of the test piece, the water absorption rate (%) is calculated from the measured weight by the above formula (1). Note that the volume of the test piece described above is an apparent volume similarly to a volume V1 described later.

In the calculation of the water absorption rate, the test piece whose weight or the like is to be measured is not limited to the test piece having the above dimensions. For example, the dimensions of the test piece can be appropriately changed according to the size, shape, etc. of the noise damper 20.

According to the pneumatic tire of the present invention, the noise damper 20 is disposed on the inner cavity surface of the tread portion 2, therefore, the cavity resonance in a tire inner cavity is suppressed, thereby, the running noise of the pneumatic tire 1 is reduced. In the present invention, the water absorption rate of the noise damper 20 calculated by the above formula (1) is not less than 10%. The noise damper 20 configured as such absorbs more resonance energy by the cells connected with the surface of the noise damper 20, therefore, large effect of suppressing the cavity resonance is exerted.

Further, in the present invention, the water absorption rate of the noise damper 20 calculated by the above formula (1) is not more than 25%. By the noise damper 20 configured as such, local absorption of the puncture repair liquid 41 is suppressed. Thereby, by the rotation of the tire during running, the puncture repair liquid 41 is likely to be uniformly distributed over the entire circumference in the tire circumferential direction without concentrating on a part of the noise damper 20 at the repair spot. Thereby, the influence on the force variation after puncture repair is suppressed, therefore, it is possible that deterioration of the uniformity of the pneumatic tire 1 is suppressed. The term "uniformity" as used herein refers to the uniformity of the weight including the pneumatic tire 1, the noise damper 20, and the puncture repair liquid 41. If such uniformity is impaired, it is possible that the running noise tends to be large.

On the other hand, in the present invention, the upper limit of the water absorption rate of the noise damper 20 is set as described above, therefore, it is possible that the suppression effect of the cavity resonance is small as compared with a pneumatic tire in which a noise damper having a higher water absorption rate is arranged.

Therefore, in this embodiment, it is preferred that a damping rubber body 30 is disposed inside the tread portion 2. The damping rubber body 30 is arranged between the carcass 6 and the belt layer 7. A width W1 in the tire axial direction of the damping rubber body 30 is in a range of from 60% to 130% of a width W2 in the tire axial direction of the belt layer. The damping rubber body 30 configured as such suppresses the vibration of the tread portion 2 without contributing to the weight increase of the pneumatic tire 1, and in particular contributes to the reduction of the running noise around 160 Hz. Thereby, it is possible that the deterioration of the uniformity of the pneumatic tire 1 after puncture repair is suppressed while effectively suppressing the running noise.

Further, the absorption of the puncture repair liquid 41 is suppressed by the noise damper 20 having the water absorption rate calculated by the above formula (1) is not more than 25%, therefore, it is possible that a small amount of the puncture repair liquid 41 is required for puncture repair of the pneumatic tire 1.

The damping rubber body 30 is formed of a rubber different from the topping rubber included in the carcass ply 6A and the belt ply 7A. In a more preferred embodiment, the width W1 of the damping rubber body 30 is in a range of from 70% to 120% of the width W2 of the belt layer 7.

In this embodiment, the water absorption rate of the noise damper 20 is limited as described above, therefore, it is possible that the effect of suppressing the cavity resonance is small as compared with a pneumatic tire provided with the noise damper having a higher water absorption rate. However, in this embodiment, the damping rubber body 30 described above is disposed between the carcass 6 and the belt layer 7, therefore, the running noise is effectively suppressed. Therefore, according to the pneumatic tire 1, it is possible that the deterioration of the uniformity of a pneumatic tire after puncture repair is suppressed while suppressing the running noise.

It is preferred that a thickness T1 in the tire radial direction of the damping rubber body 30 is not less than 0.3 mm. By setting the thickness T1 to not less than 0.3 mm, the vibration of the tread portion 2 is more effectively suppressed. Further, by setting a maximum thickness in the tire radial direction of the damping rubber body 30 in a range of from 4% to 20% of a maximum thickness of the tread portion 2, it is possible that the suppression of the running noise of the pneumatic tire 1 and the steering stability are obtained easily.

It is preferred that the relationship between hardness H1 of the damping rubber body 30 and hardness H2 of the tread rubber Tg disposed on an outer side in the tire radial direction of the belt layer 7 is 0.5≤H1/H2≤1.0. Here, "rubber hardness" is defined as rubber hardness measured in accordance with Japanese Industrial Standard JIS-K 6253 by a type-A durometer under an environment of 23 degrees Celsius. By the damping rubber body 30 having the hardness H1 described above, the vibration of the tread portion 2 is more effectively suppressed while ensuring the durability of the tread portion 2.

It is preferred that relationship between the hardness H1 of the damping rubber body 30 and hardness H3 of the topping rubber included in the carcass ply 6A and the belt ply 7A is 0.4≤H1/H3≤1.2. By the damping rubber body 30 of the hardness H1, vibration of the tread portion 2 is more effectively suppressed while securing the durability of the tread portion 2.

More specifically, it is preferred that the hardness H1 of the damping rubber body 30 is in a range of from 30 to 73 degrees. With the damping rubber body 30 of hardness H1 configured as such, it is possible that the running noise is easily suppressed and the steering stability is improved while suppressing manufacturing cost of the pneumatic tire 1. Further, more specifically, it is preferred that the hardness H2 of the tread rubber Tg is in a range of from 55 to 75 degrees. By the tread rubber Tg of the hardness H2 configured as such, the rigidity of the tread portion 2 is optimized, therefore, it is possible that the steering stability is improved.

It is preferred that density of the noise damper 20 is in a range of from 10 to 40 kg/m3. By the noise damper 20 having the density not less than 10 kg/m3, it is possible that deterioration of the uniformity of the pneumatic tire 1 after puncture repair is suppressed. By the noise damper 20 having the density not more than 40 kg/m3, it is possible that the running noise in the vicinity of 250 Hz in particular is decreased without increasing the weight of the pneumatic tire 1.

It is preferred that the volume V1 of the noise damper 20 is in a range of from 0.4% to 30% of total volume V2 of the tire inner cavity. The volume V1 of the noise damper 20 is apparent total volume of the noise damper 20, which means the volume determined from the outer shape including the inner cells. The total volume V2 of the tire inner cavity is to be approximately determined by the following formula with respect to a pneumatic tire in the standard state in which the pneumatic tire is mounted on a standard rim, inflated to the standard inner pressure, and loaded with no tire load.

$$V2 = A \times \{(Di-Dr)/2 + Dr\} \times \pi$$

In the above formula, "A" is a cross sectional area of the tire inner cavity obtained by CT scanning a tire/rim assembly in the standard state, "Di" is a maximum outer diameter of the inner cavity surface of the tire in the standard state, "Dr" is a diameter of the rim, and "π" is the circumference ratio.

If the volume V1 is less than 0.4% of the total volume V2, it is possible that the vibration energy of the air is not sufficiently converted. If the volume V1 is more than 30% of the total volume V2, it is possible that the weight and manufacturing cost of the pneumatic tire 1 increases, and that the uniformity of the pneumatic tire 1 after the puncture repair deteriorates.

It is preferred that tensile strength of the noise damper 20 is in a range of from 70 to 115 kPa. If the tensile strength of the noise damper 20 is less than 70 kPa, it is possible that the durability of the noise damper 20 deteriorates. If the tensile strength of the noise damper 20 is more than 115 kPa, when a foreign object such as a nail sticks into the region including the noise damper 20 of the tread portion 2, the noise damper 20 may be pulled by the foreign object, therefore, it is possible that the noise damper 20 comes off the inner cavity surface of the tread portion 2.

It is preferred that a loss tangent tan δ at 0 degree Celsius of the tread rubber Tg is not less than 0.4. Thereby, wet grip performance of the pneumatic tire 1 is improved. Therefore, by setting the volume of the grooves formed in the ground contacting surface of the tread portion 2 to be small and the like, it is possible to further reduce the running noise, for example. It is preferred that the loss tangent tan δ at 70 degrees Celsius of the tread rubber Tg is not more than 0.2. Thereby, rolling resistance of the pneumatic tire 1 is suppressed and deterioration of the fuel efficiency due to inclusion of the noise damper 20 and the damping rubber body 30 is suppressed. Note that the loss tangent tan δ at 0 degrees Celsius and the loss tangent tan δ at 70 degrees Celsius were measured in accordance with Japanese Industrial Standard JIS-K 6394 by using a viscoelasticity spectrometer available from Iwamoto Quartz GlassLab Co., Ltd. under a condition of respective temperature (0 degrees Celsius or 70 degrees Celsius), a frequency of 10 Hz, an initial tensile strain of 10%, and an amplitude of dynamic strain of ±2%.

It is preferred that a value calculated by a following formula: (1.4×carbon black content (phr)+silica content (phr))/sulfur content (phr) of the tread rubber Tg, is not less than 20. Thereby, anti-wear performance is improved. Therefore, by setting depths of the grooves formed in the ground contacting surface of the tread portion 2 to be small and the like, it is possible that the running noise is further decreased, for example. Further, even when distribution of the puncture repair liquid is not uniform, occurrence of uneven wear is suppressed.

While detailed description has been made of the pneumatic tire of the present invention, the present invention can be embodied in various forms without being limited to the illustrated embodiment.

Figure 3:
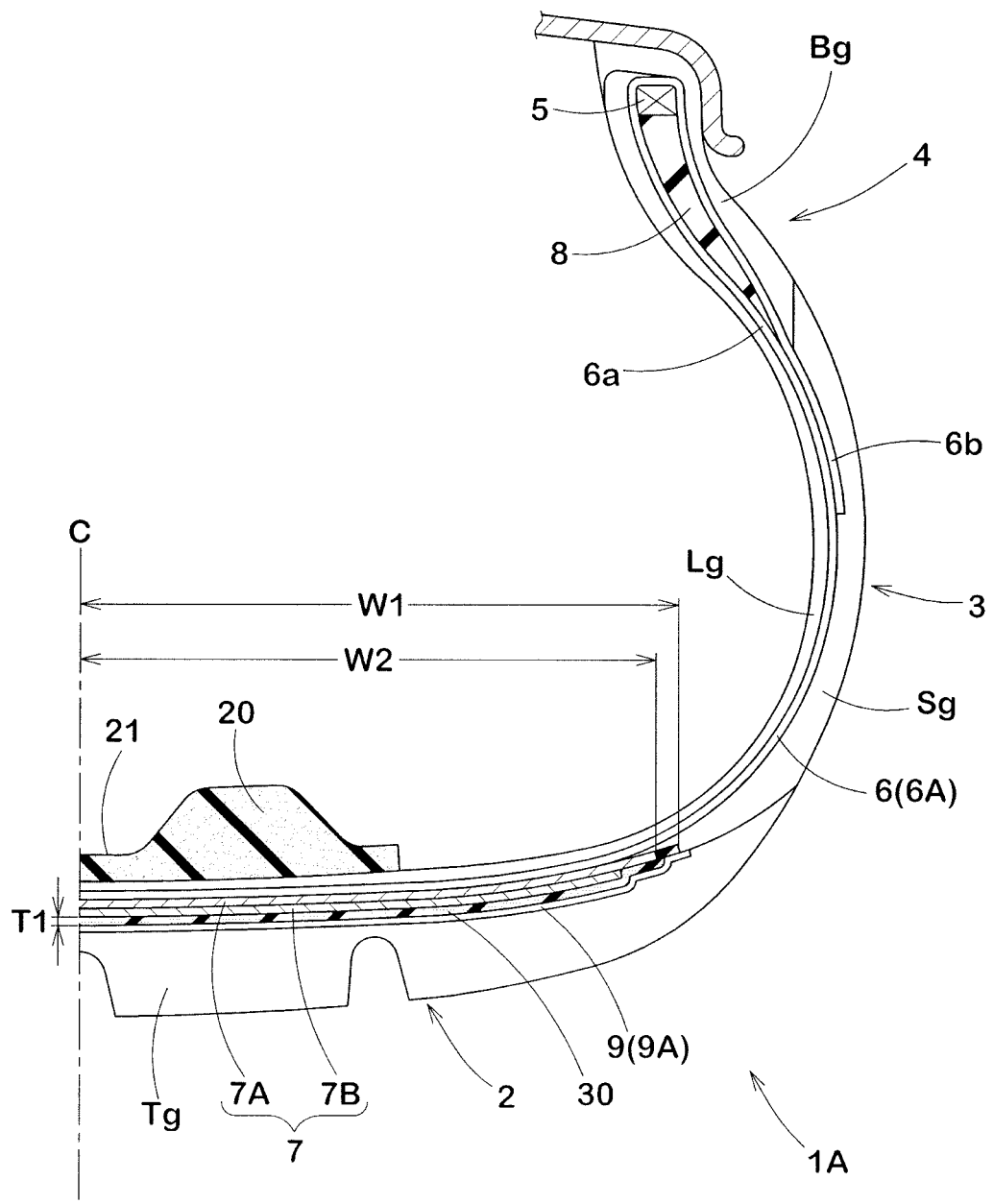
FIG. 3 a cross-sectional view of a pneumatic tire as another embodiment of the present invention.

FIG. 3 shows a pneumatic tire 1A as another embodiment of the present invention, for example. The pneumatic tire 1A is different from the pneumatic tire 1 in that the damping rubber body 30 is disposed between the belt layer 7 and the band layer 9. The configuration of the pneumatic tire 1 can be applied to the components of the pneumatic tire 1A that are not described below. In the pneumatic tire 1A, the vibration of the belt layer 7 and the band layer 9 is suppressed by the damping rubber body 30, therefore, the vibration of the tread portion 2 is suppressed eventually.

Figure 4:
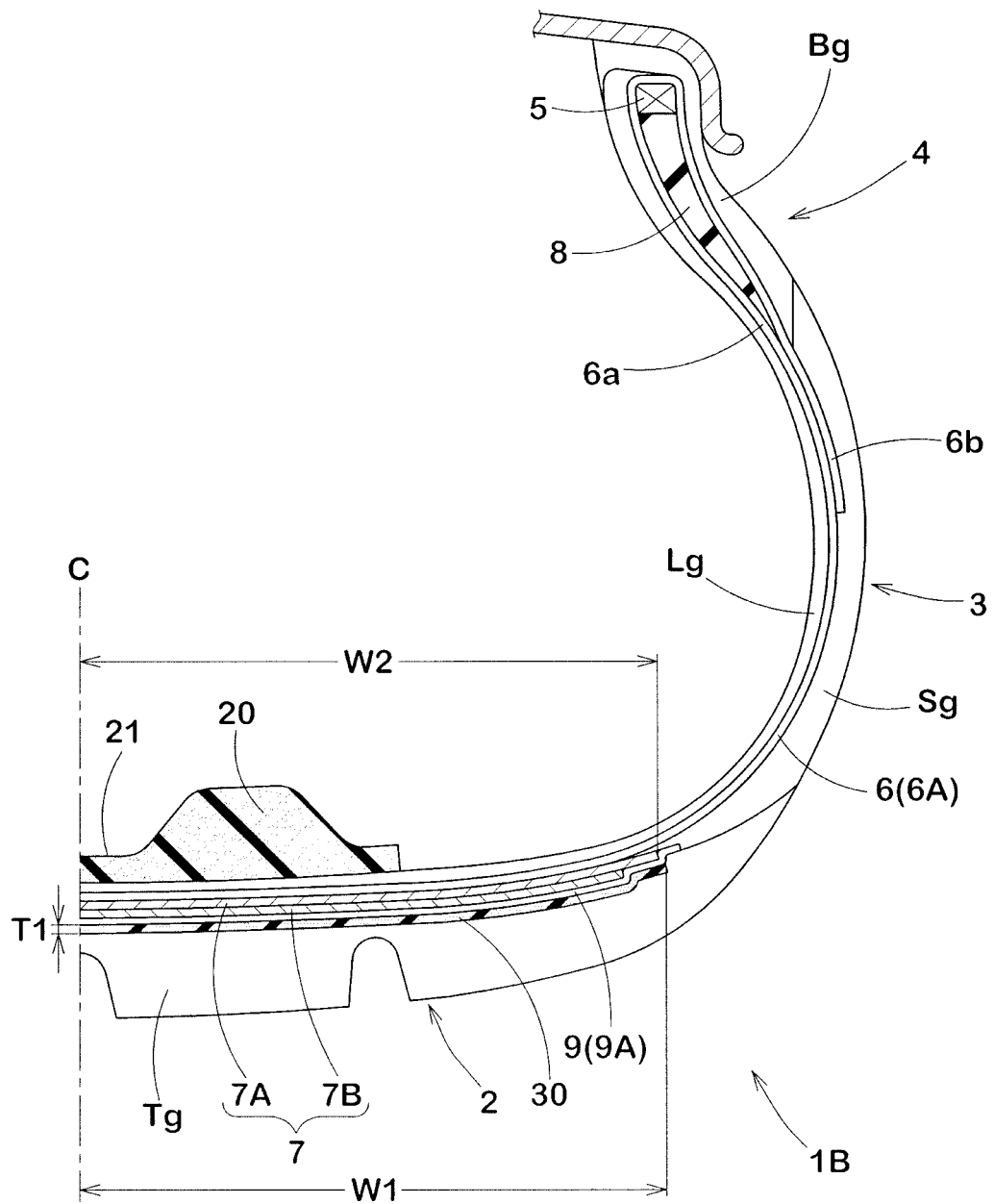
FIG. 4 a cross-sectional view of a pneumatic tire as another embodiment of the present invention.

FIG. 4 shows a pneumatic tire 1B as yet another embodiment of the present invention. The pneumatic tire 1B is different from the pneumatic tire 1 in that the damping rubber body 30 is arranged on an outer side in the tire radial direction of the band layer 9. The configuration of the pneumatic tire 1 can be applied to the components of the pneumatic tire 16 that are not described below. In the pneumatic tire 1B, the vibration of the band layer 9 and the tread rubber Tg is suppressed by the damping rubber body 30, therefore, the vibration of the tread portion 2 is suppressed eventually.

Working Examples (Examples)

Pneumatic tires of size 165/65R18 having the basic structure shown in FIG. 1 were made by way of test according to the specification listed in Table 1, then the test tires were tested for uniformity performance and noise performance after puncture repair. The specifications common to each of the Examples and the References were as follows.
(1) Tread Rubber
The formulations were as follows.
Natural rubber (TSR20): 15 (phr)
SBR 1 (bound styrene content: 28%, vinyl group content: 60%, glass transition point: −25 degrees Celsius, terminal modified): 45 (phr)
SBR 2 (bound styrene content: 35%, vinyl group content: 45%, glass transition point: −25 degrees Celsius, terminal modified): 25 (phr)
BR (BR150B available from Ube Industries, Ltd.): 15 (phr)
Carbon black N220: 5 (phr)
Silica (VN3): 35 (phr)
Silica (1115MP): 20 (phr)
Silane coupling agent Si266: 4 (phr)
Resin (SYLVARES SA85 available from Arizona Chemical Company): 8 (phr)
Oil: 4 (phr)
Wax: 1.5 (phr)
Age resistor (6C): 3 (phr)
Stearic acid: 3 (phr)
Zinc oxide: 2 (phr)
Sulfur: 2 (phr)
Vulcanization accelerator (NS): 2 (phr)
Vulcanization accelerator (DPG): 2 (phr)
The hardness of the tread rubber of the vulcanized tire was 64 degrees.
The maximum thickness of the tread rubber was 10 mm.
(2) Damping Rubber Body
The formulations were as follows.
Natural rubber (TSR20): 65 (phr)
SBR (Nipol 1502): 35 (phr)
Carbon black N220: 52 (phr)
Oil: 15 (phr)
Stearic acid: 1.5 (phr)
Zinc oxide: 2 (phr)
Sulfur: 3 (phr)
Vulcanization accelerator (CZ): 1 (phr)
The hardness of the damping rubber body of the vulcanized tire was 58 degrees.
The maximum thickness of the damping rubber body was 1 mm.
(3) Noise Damper
The volume was 15% of the total volume of the tire inner cavity.
The density was 27 kg/m3.
(4) Belt Cords
The angle of the belt cords with respect to the tire equator was 41 degrees.
The test methods were as follows.
<Uniformity Performance>

Each of the test tires was mounted on a rim of 18×7JJ and injected with puncture repair material simulating puncture repair, and then radial force variation (RFV) was measured under the condition of the inner pressure of 320 kPa in accordance with uniformity test condition of Japanese Automobile standards Organization JASO C607:2000. The evaluation speed was 10 km/h. The results are indicated by an index based on Example 1 being 100, wherein the larger the numerical value, the smaller the RFV is, which is better.
<Noise Performance>

Each of the test tires was mounted on a rim of 18×7JJ and mounted on all wheels of a test car (domestically produced FR car with displacement of 2500 cc) under the condition of the inner pressure of 320 kPa. A total sound pressure (decibel) of frequencies in a range of from 100 to 200 Hz and in a range of from 200 to 300 Hz was measured by using a sound concentrating microphone attached to the center part of the backrest of the driver's seat while the test car was driven on a road for measuring road noise (rough asphalt surface road) at a speed of 60 km/h. The results are indicated by an index based on Example 1 being 100, wherein the larger the numerical value, the smaller the running noise is, which is better.

TABLE 1

|  |  | Ref. 1 | Ref. 2 | Ref. 3 | Ex. 1 | Ex. 2 |
| --- | --- | --- | --- | --- | --- | --- |
| Presence or Absence of Noise damper |  | absence | presence | presence | presence | presence |
| Water absorption rate of Noise damper | [%] | — | 5 | 40 | 10 | 25 |
| Presence or Absence of Damping rubber body |  | absence | absence | absence | absence | absence |
| Uniformity performance | [index] | 100 | 100 | 80 | 100 | 95 |
| Noise performance | [index] | 80 | 85 | 105 | 100 | 105 |

As is clear from Table 1, it was confirmed that the uniformity performance and the noise performance of the pneumatic tires as Examples 1 and 2 were significantly improved in a good balance as compared with References 1 to 3.

Further, as shown in Table 2, pneumatic tires as Examples 3 to 6 were made by way of test, and then the uniformity performance and the noise performance were tested. The test methods were as follows.

<Uniformity Performance>

The radial force variation (RFV) was measured by the same method as described above. The results are indicated by an index based on Example 3 being 100, wherein the larger the numerical value, the smaller the RFV is, which is better.

<Noise Performance>

The in-car noise was measured by the same method as described above. The results are indicated by an index based on Example 3 being 100, wherein the larger the numerical value, the smaller the running noise is, which is better.

TABLE 2

|  |  | Ex. 3 | Ex. 4 | Ex. 5 | Ex. 6 |
| --- | --- | --- | --- | --- | --- |
| Presence or Absence of Noise damper |  | presence | presence | presence | presence |
| Water absorption rate of Noise damper | [%] | 20 | 20 | 20 | 20 |
| Presence or Absence of Damping rubber body |  | presence | presence | presence | presence |
| Width W1 of Damping rubber body/Width W2 of Belt layer | [%] | 100 | 60 | 70 | 130 |
| Uniformity performance | [index] | 100 | 100 | 100 | 100 |
| Noise performance | [index] | 100 | 95 | 98 | 105 |

7 to 10 were made by way of test, and then the noise performance and the steering stability were tested. The test methods were as follows.

<Noise Performance>

The in-car noise was measured by the same method as described above. The results are indicated by an index based on Example 9 being 100, wherein the larger the numerical value, the smaller the running noise is, which is better.

<Steering Stability>

While the test car used in the test of the noise performance was driven on a dry asphalt test course, characteristics related to steering response, rigid impression, grip, and the like were evaluated by the driver's feeling. The results are indicated by an evaluation point based on Example 9 being 100, wherein a larger numerical value is better.

TABLE 3

|  |  | Ex. 7 | Ex. 8 | Ex. 9 | Ex. 10 |
| --- | --- | --- | --- | --- | --- |
| Presence or Absence of Noise damper |  | presence | presence | presence | presence |
| Water absorption rate of Noise damper | [%] | 20 | 20 | 20 | 20 |
| Presence or Absence of Damping rubber body |  | presence | presence | presence | presence |
| Width W1 of Damping rubber body/Width W2 of Belt layer | [%] | 100 | 100 | 100 | 100 |
| Thickness T1 of Damping rubber body | [mm] | 0.2 | 0.3 | 0.5 | 0.7 |
| Noise performance | [index] | 98 | 99 | 100 | 103 |
| Steering stability | [index] | 100 | 100 | 100 | 98 |

Furthermore, as shown in Table 4, pneumatic tires as Examples 11 to 15 having the damping rubber body of different rigidity were made by way of test, and then the noise performance was tested and manufacturing cost was calculated. The test method and the calculation method were as follows.

<Noise Performance>

The in-car noise was measured by the same method as described above. The results are indicated by an index based on Example 13 being 100, wherein the larger the numerical value, the smaller the running noise is, which is better.

<Manufacturing Cost>

Manufacturing cost required to manufacture a single tire was calculated. The results are indicated by an index based on Example 13 being 100, wherein the larger the numerical value, the smaller the manufacturing cost is, which is better.

TABLE 4

|  |  | Ex. 11 | Ex. 12 | Ex. 13 | Ex. 14 | Ex. 15 |
| --- | --- | --- | --- | --- | --- | --- |
| Presence or Absence of Noise damper |  | presence | presence | presence | presence | presence |
| Water absorption rate of Noise damper | [%] | 20 | 20 | 20 | 20 | 20 |
| Presence or Absence of Damping rubber body |  | presence | presence | presence | presence | presence |
| Width W1 of Damping rubber body/Width W2 of Belt layer | [%] | 100 | 100 | 100 | 100 | 100 |
| Hardness H1 of Damping rubber body/Hardness H2 of Tread rubber |  | 0.4 | 0.5 | 0.7 | 1.0 | 1.2 |
| Noise performance | [index] | 96 | 98 | 100 | 102 | 102 |
| Manufacturing cost | [index] | 102 | 102 | 100 | 98 | 96 |

Furthermore, as shown in Table 5, pneumatic tires as Examples 16 to 20 were made by way of test, and then the uniformity performance and the noise performance after puncture repair were tested. The test methods were as follows.

<Uniformity Performance>

The RFV was measured by the same method as described above. The results are indicated by an index based on Example 18 being 100, wherein the larger the numerical value, the smaller the RFV is, which is better.

<Noise Performance>

The in-car noise was measured by the same method as described above. The results are indicated by an index based on Example 18 being 100, wherein the larger the numerical value, the smaller the running noise is, which is better.

TABLE 5

|  |  | Ex. 16 | Ex. 17 | Ex. 18 | Ex. 19 | Ex. 20 |
| --- | --- | --- | --- | --- | --- | --- |
| Presence or Absence of Noise damper |  | presence | presence | presence | presence | presence |
| Water absorption rate of Noise damper | [%] | 20 | 20 | 20 | 20 | 20 |
| Presence or Absence of Damping rubber body |  | presence | presence | presence | presence | presence |
| Width W1 of Damping rubber body/Width W2 of Belt layer | [%] | 100 | 100 | 100 | 100 | 100 |
| Density of Noise damper | [kg/m3] | 5 | 10 | 27 | 40 | 50 |
| Uniformity performance | [index] | 95 | 97 | 100 | 103 | 103 |
| Noise performance | [index] | 103 | 103 | 100 | 97 | 95 |

Furthermore, as shown in Table 6, pneumatic tires as Examples 21 to 25 were made by way of test, and then the uniformity performance and the noise performance were tested. The test methods were as follows.

<Uniformity Performance>

The RFV was measured by the same method as described above. The results are indicated by an index based on Example 23 being 100, wherein the larger the numerical value, the smaller the RFV is, which is better.

<Noise Performance>

The in-car noise was measured by the same method as described above. The results are indicated by an index based on Example 23 being 100, wherein the larger the numerical value, the smaller the running noise is, which is better.

TABLE 6

|  |  | Ex. 21 | Ex. 22 | Ex. 23 | Ex. 24 | Ex. 25 |
| --- | --- | --- | --- | --- | --- | --- |
| Presence or Absence of Noise damper |  | presence | presence | presence | presence | presence |
| Water absorption rate of Noise damper | [%] | 20 | 20 | 20 | 20 | 20 |
| Presence or Absence of Damping rubber body |  | presence | presence | presence | presence | presence |
| Width W1 of Damping rubber body/Width W2 of Belt layer | [%] | 100 | 100 | 100 | 100 | 100 |
| Volume V1 of Noise damper/Total volume V2 of Tire inner cavity | [%] | 0.3 | 0.4 | 15.0 | 30.0 | 35.0 |
| Uniformity performance | [index] | 103 | 103 | 100 | 97 | 95 |
| Noise performance | [index] | 95 | 97 | 100 | 103 | 103 |

Furthermore, as shown in Table 7, pneumatic tires as Examples 26 to 31 were made by way of test, and then the durability of the noise damper and separation resistance performance of the noise damper when a nail sticks into the tire were tested. The test methods were as follows.

<Durability of Noise Damper>

Each of the test tires was mounted on a rim of 18×7JJ and then, by using a drum testing machine, a distance until the noise damper and its vicinity were damaged was measured under the conditions of the inner pressure of 320 kPa, the tire load of 4.8 kN, and the speed of 80 km/h. The results are indicated by an index based on Example 28 being 100, wherein the larger the numerical value, the higher the durability is, which is better.

<Separation Resistance Performance of Noise Damper when Nail Sticks>

Each of the test tires was mounted on a rim of 18×6.5J and punctured by rolling on a nail, then the damaged part was disassembled to measure the area of separation of the noise damper from the inner cavity surface of the tread portion due to the noise damper being pulled by the nail. The results are indicated by an index based on Example 28 being 100, wherein the larger the numerical value, the higher the separation resistance performance is, which is better.

TABLE 7

|  |  | Ex. 26 | Ex. 27 | Ex. 28 | Ex. 30 | Ex. 31 |
| --- | --- | --- | --- | --- | --- | --- |
| Presence or Absence of Noise damper |  | presence | presence | presence | presence | presence |
| Water absorption rate of Noise damper | [%] | 20 | 20 | 20 | 20 | 20 |
| Presence or Absence of Damping rubber body |  | presence | presence | presence | presence | presence |
| Width W1 of Damping rubber body/Width W2 of Belt layer | [%] | 100 | 100 | 100 | 100 | 100 |
| Tensile strength of Noise damper | [kPa] | 60 | 70 | 90 | 115 | 125 |
| Durability of Noise damper | [index] | 95 | 97 | 100 | 103 | 103 |
| Separation resistance performance of Noise damper when Nail sticks | [index] | 103 | 103 | 100 | 97 | 95 |

Furthermore, as shown in Table 8, pneumatic tires as Examples 32 and 33 were made by way of test, and then the uniformity performance and the noise performance after puncture repair were tested. The test methods were as follows.

<Uniformity Performance>

The radial force variation (RFV) was measured by the same method as described above. The results are indicated by an index based on Example 1 being 100, wherein the larger the numerical value, the smaller the RFV is, which is better.

<Noise Performance>

The in-car noise was measured by the same method as described above. The results are indicated by an index based on Example 1 being 100, wherein the larger the numerical value, the smaller the running noise is, which is better.

TABLE 8

|  |  | Ex. 32 | Ex. 33 |
|---|---|---|---|
| Presence or Absence of Noise damper |  | presence | presence |
| Water absorption rate of Noise damper | [%] | 10 | 25 |
| Presence or Absence of Damping rubber body |  | presence | presence |

TABLE 8-continued

|  |  | Ex. 32 | Ex. 33 |
|---|---|---|---|
| Width W1 of Damping rubber body/Width W2 of Belt layer | [%] | 100 | 100 |
| Uniformity performance | [index] | 100 | 95 |
| Noise performance | [index] | 106 | 111 |

Furthermore, as shown in Table 9, pneumatic tires as Examples 34 to 38 were made by way of test, and then the uniformity performance and the noise performance after puncture repair were tested. The test methods were as follows.

<Uniformity Performance>

The radial force variation (RFV) was measured by the same method as described above. The results are indicated by an index based on Example 18 being 100, wherein the larger the numerical value, the smaller the RFV is, which is better.

<Noise Performance>

The in-car noise was measured by the same method as described above. The results are indicated by an index based on Example 18 being 100, wherein the larger the numerical value, the smaller the running noise is, which is better.

TABLE 9

|  |  | Ex. 34 | Ex. 35 | Ex. 36 | Ex. 37 | Ex. 38 |
|---|---|---|---|---|---|---|
| Presence or Absence of Noise damper |  | presence | presence | presence | presence | presence |
| Water absorption rate of Noise damper | [%] | 20 | 20 | 20 | 20 | 20 |
| Presence or Absence of Damping rubber body |  | absence | absence | absence | absence | absence |
| Density of Noise damper | [kg/m3] | 5 | 10 | 27 | 40 | 50 |
| Uniformity performance | [index] | 95 | 97 | 100 | 103 | 103 |
| Noise performance | [index] | 97 | 97 | 94 | 91 | 88 |

Furthermore, as shown in Table 10, pneumatic tires as Examples 39 to 43 were made by way of test, and then the uniformity performance and the noise performance after puncture repair were tested. The test methods were as follows.

<Uniformity Performance>

The radial force variation (RFV) was measured by the same method as described above. The results are indicated by an index based on Example 23 being 100, wherein the larger the numerical value, the smaller the RFV is, which is better.

<Noise Performance>

The in-car noise was measured by the same method as described above. The results are indicated by an index based on Example 23 being 100, wherein the larger the numerical value, the smaller the running noise is, which is better.

TABLE 10

|  |  | Ex. 39 | Ex. 40 | Ex. 41 | Ex. 42 | Ex. 43 |
|---|---|---|---|---|---|---|
| Presence or Absence of Noise damper |  | presence | presence | presence | presence | presence |
| Water absorption rate of Noise damper | [%] | 20 | 20 | 20 | 20 | 20 |
| Presence or Absence of Damping rubber body |  | absence | absence | absence | absence | absence |
| Volume V1 of Noise damper/Total volume V2 of Tire inner cavity | [%] | 0.3 | 0.4 | 15.0 | 30.0 | 35.0 |
| Uniformity performance | [index] | 103 | 103 | 100 | 97 | 95 |
| Noise performance | [index] | 89 | 91 | 94 | 98 | 98 |

DESCRIPTION OF THE REFERENCE SIGNS 1 pneumatic tire
2 tread portion
3 sidewall portion
4 bead portion
5 bead core
6 carcass
20 noise damper
30 damping rubber body

The invention claimed is:

1. A pneumatic tire comprising a carcass extending between bead cores of bead portions via a tread portion and sidewall portions, a belt layer arranged on an outer side in a tire radial direction of the carcass and inside of the tread portion, and a noise damper made of a porous sponge material and arranged on an inner cavity surface of the tread portion, wherein
a water absorption rate of the noise damper is in a range of from 20% to 25%, the water absorption rate being calculated by a following formula (1):

$$\text{water absorption rate (\%)} = \text{weight change before and after immersion (g)/volume at 50\% compression } (\text{cm}^3) \times 100 \quad (1),$$

the sponge material is made of polyurethane or rubber sponge,
the noise damper has
an elongated belt shape having a bottom surface fixed to the inner cavity surface of the tread portion,
a same cross-sectional shape at an arbitrary position in a tire circumferential direction except for outer end portions in the tire circumferential direction of the noise damper,
a density in a range of from 10 to 40 kg/m$^3$, and
a tensile strength in a range of from 70 to 115 kPa,
volume V1 of the noise damper is in a range of from 0.4% to 30% of total volume V2 of the tire inner cavity,
the carcass is formed by a carcass ply,
the carcass ply is formed by a plurality of carcass cords covered with topping rubber and arranged at an angle in a range of from 70 to 90 degrees with respect to a tire equator,
the carcass cords are made of an organic fiber including aromatic polyamide or rayon,
the carcass ply includes a main body portion extending between the bead cores and turned up portions each being turned up around a respective one of the bead cores from inside to outside in a tire axial direction so as to be engaged with the respective one of the bead cores,
a bead apex rubber extending radially outwardly from a respective one of the bead cores in a tapered manner is arranged between the main body portion and each of the turned up portions,
the belt layer is formed by two belt plies in which belt cords are arranged at an angle in a range of from 15 to 45 degrees with respect to the tire equator,
the belt plies are overlapped in the tire radial direction so that the belt cords of one of the belt plies and the belt cords of the other one of the belt plies cross each other,
the belt cords are made of steel, aramid, or rayon,
a band layer is arranged on an outer side in the tire radial direction of the belt layer and inside of the tread portion,
the band layer includes a band ply in which band cords made of an organic fiber including nylon are spirally wound at an angle not more than 10 degrees with respect to the tire circumferential direction,
a tread rubber forming the tread portion is a rubber composition including carbon black, silica, and sulfur, and having a value not less than 20, the value being calculated by a following formula (2):

$$(1.4 \times \text{carbon black content(phr)} + \text{silica content(phr)})/\text{sulfur content(phr)} \quad (2),$$

the tread rubber includes natural rubber, styrene-butadiene rubber, and butadiene rubber as a rubber component,
the tread rubber includes resin and has a hardness in a range of from 55 to 75 degrees,
a loss tangent tan δ at 0 degree Celsius of the tread rubber is not less than 0.4, and
the loss tangent tan δ at 70 degrees Celsius of the tread rubber is not more than 0.2.

2. A pneumatic tire comprising a carcass extending between bead cores of bead portions via a tread portion and sidewall portions, a belt layer arranged on an outer side in a tire radial direction of the carcass and inside of the tread portion, and a noise damper made of a porous sponge material and arranged on an inner cavity surface of the tread portion, wherein
a water absorption rate of the noise damper is in a range of from 20% to 25%, the water absorption rate being calculated by a following formula (1):

$$\text{water absorption rate (\%)} = \text{weight change before and after immersion (g)/volume at 50\% compression } (\text{cm}^3) \times 100 \quad (1),$$

the sponge material is made of polyurethane or rubber sponge,
the noise damper has an elongated belt shape having a bottom surface fixed to the inner cavity surface of the tread portion and extends in a tire circumferential direction so as to form an annular shape having a same cross-sectional shape at an arbitrary position in the tire circumferential direction except for outer end portions in the tire circumferential direction of the noise damper,
the cross-sectional shape is a flat and horizontally elongated shape in which a height is smaller than a width in the tire axial direction,
the noise damper has a density in a range of from 10 to 40 kg/m$^3$ and a tensile strength in a range of from 70 to 115 kPa, and
volume V1 of the noise damper is in a range of from 0.4% to 30% of total volume V2 of the tire inner cavity.

3. The pneumatic tire according to claim 2, wherein
the carcass is formed by a carcass ply, and
the carcass ply is formed by a plurality of carcass cords covered with topping rubber and arranged at an angle in a range of from 70 to 90 degrees with respect to a tire equator.

4. The pneumatic tire according to claim 3, wherein the carcass cords are made of an organic fiber including aromatic polyamide or rayon.

5. The pneumatic tire according to claim 3, wherein
the carcass ply includes a main body portion extending between the bead cores and turned up portions each being turned up around a respective one of the bead cores from inside to outside in a tire axial direction so as to be engaged with the respective one of the bead cores, and a bead apex rubber extending radially outwardly from a respective one of the bead cores in a tapered manner is arranged between the main body portion and each of the turned up portions.

6. The pneumatic tire according to claim 2, wherein the belt layer is formed by two belt plies in which belt cords are arranged at an angle in a range of from 15 to 45 degrees with respect to a tire equator, and the belt plies are overlapped in the tire radial direction so that the belt cords of one of the belt plies and the belt cords of the other one of the belt plies cross each other.

7. The pneumatic tire according to claim 6, wherein the belt cords are made of steel, aramid, or rayon.

8. The pneumatic tire according to claim 2, wherein a band layer is arranged on an outer side in the tire radial direction of the belt layer and inside of the tread portion, the band layer includes a band ply in which band cords made of an organic fiber including nylon are spirally wound at an angle not more than 10 degrees with respect to the tire circumferential direction.

9. The pneumatic tire according to claim 8, wherein the band cords are spirally wound at the angle not more than 5 degrees with respect to the tire circumferential direction.

10. The pneumatic tire according to claim 2, wherein a tread rubber forming the tread portion is a rubber composition including carbon black, silica, and sulfur, and having a value not less than 20, the value being calculated by a following formula (2):

$$(1.4 \times \text{carbon black content(phr)} + \text{silica content(phr)}) / \text{sulfur content(phr)} \qquad (2).$$

11. The pneumatic tire according to claim 2, wherein a tread rubber forming the tread portion includes natural rubber, styrene-butadiene rubber, and butadiene rubber as a rubber component.

12. The pneumatic tire according to claim 2, wherein a tread rubber forming the tread portion includes resin.

13. The pneumatic tire according to claim 2, wherein a tread rubber forming the tread portion has a hardness in a range of from 55 to 75 degrees.

14. The pneumatic tire according to claim 2, wherein a tread rubber forming the tread portion has a loss tangent tan δ at 0 degree Celsius of not less than 0.4.

15. The pneumatic tire according to claim 2, wherein a tread rubber forming the tread portion has a loss tangent tan δ at 70 degrees Celsius of not more than 0.2.

16. The pneumatic tire according to claim 2, wherein a tread rubber for forming a ground contacting surface, sidewall rubbers each for forming an outer surface of a respective one of the sidewall portions, bead rubbers each for forming an outer surface of a respective one of the bead portions are arranged on an outer side of the carcass, and an inner liner rubber for keeping tire inner pressure is arranged on an inner side of the carcass.

17. The pneumatic tire according to claim 2, wherein the weight change before and after immersion is obtained by measuring a weight of a test piece of the noise damper before immersion, compressing the test piece by 50% in a thickness direction of the test piece, and then measuring the weight of the test piece after immersion in water at a temperature of 20 degrees Celsius and at water depth of 10 cm for 24 hours.

18. The pneumatic tire according to claim 2, wherein volume V1 of the noise damper is in a range of from 0.4% to 30% of total volume V2 of the tire inner cavity, and the total volume V2 of the tire inner cavity is determined by a following formula (3) with respect to the pneumatic tire in a standard state in which the pneumatic tire is mounted on a standard rim, inflated to a standard inner pressure, and loaded with no tire load:

$$V2 = A \times \{(Di - Dr)/2 + Dr\} \times n \qquad (3).$$

* * * * *